W. C. CLARK.
BOX COUPLING.
APPLICATION FILED MAR. 21, 1917.

1,248,423.

Patented Nov. 27, 1917.

WITNESSES:
Geo. H. Blankman
P. Davis

INVENTOR.
William C. Clark
BY H. M. Plaisted
HIS ATTORNEY.

UNITED STATES PATENT OFFICE.

WILLIAM C. CLARK, OF ST. LOUIS, MISSOURI.

BOX-COUPLING.

1,248,423.  Specification of Letters Patent.  Patented Nov. 27, 1917.

Application filed March 21, 1917. Serial No. 156,437.

*To all whom it may concern:*

Be it known that I, WILLIAM C. CLARK, a citizen of the United States, residing at St. Louis, State of Missouri, have invented certain new and useful Improvements in Box-Couplings, of which the following is a specification.

This invention relates to certain new and useful improvements in box couplings for shafts, and is especially adapted for coupling the lower roll of a hot mill to the driving spindle.

The object of my invention is to overcome the backlash and promote the efficiency of the driven mill.

To this end my improvements have reference to a multiple number of locking pieces interposed between the driving and the driven members, and so disposed and arranged with regard to said members and a retaining member, that the driving force is transmitted without irregularity or backlash.

Figure 1:
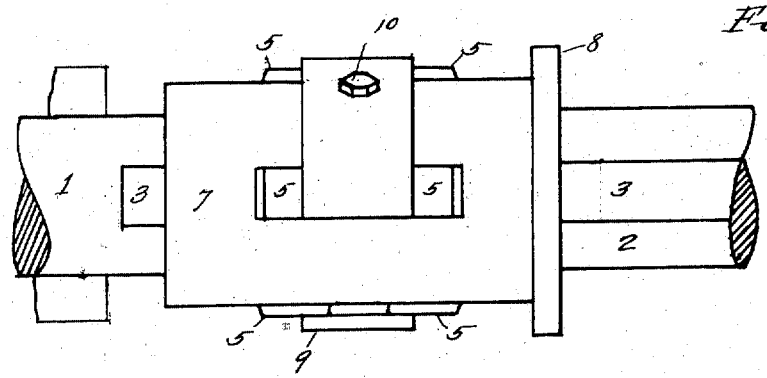
Figure 2:
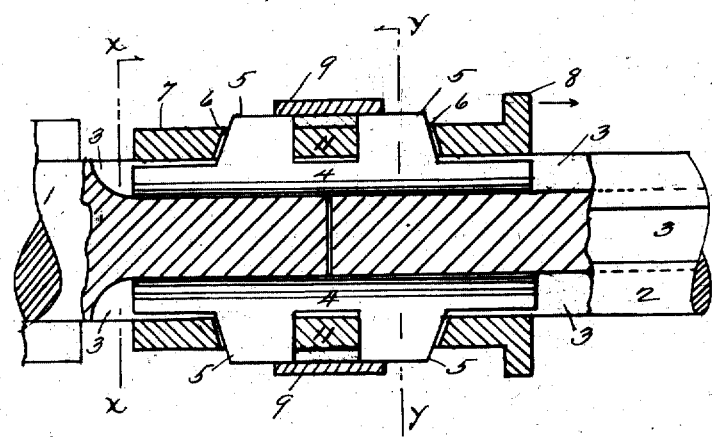
Figure 3:
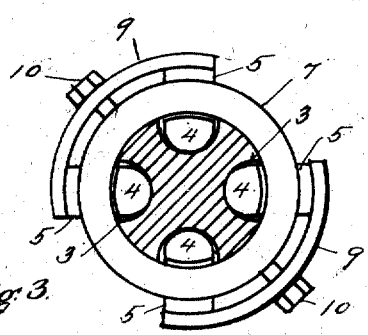

In the accompanying drawing on which like reference letters indicate corresponding parts, Figure 1 represents the ends of a hot roll and a driving spindle connected by a box coupling exemplifying my invention;

Fig. 2, a longitudinal section on an axial plane;

Fig. 3, a cross section on the line $x\ x$ of Fig. 2; and

Figure 4:
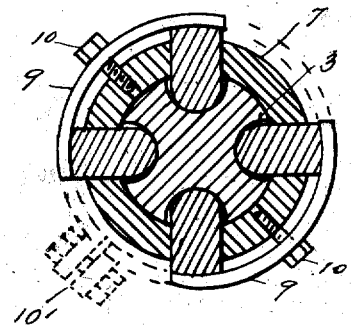

Fig. 4, a cross section on the line $y\ y$ of the same figure.

The numeral 1 designates, for example, one end of the lower roll of a hot mill for rolling plates and sheet metal, and 2 the adjacent end of a driving spindle. Both members are provided with recesses or grooves 3 preferably four in number, parallel to the axis and practically matching when the members are properly alined. The bottom of the recesses are rounding and the sides approach more and more to radial planes as they near the circumference of the roll or the spindle; they may be otherwise shaped, however.

In these grooved recesses are located locking pieces or keys 4 that span the joint between the end of the roll or "wabble", and the adjacent end of said spindle. The bottom edges of these are rounded or otherwise formed to match the grooved recesses 3, and have horns 5 (preferably two) projecting outward through corresponding openings 6 in a sleeve 7 that fits slidingly over the ends of the wabble and spindle. This sleeve has a collar 8 by which it may be engaged to slide it along the spindle in the direction of the arrow to free the end of the wabble from the said keys which fit loosely within the sleeve and grooves except when held firmly in said grooves by the compressive action on the said horns 5. The form of clip illustrated engages by its ends the horns of two adjacent keys and is secured through its middle by a screw bolt 10 entering a threaded opening in said sleeve. By means of this bolt a compression can be exerted on the horns of the said keys, and since the horns extend beyond the outer circumference of the sleeve a space is left between the clip and the sleeve which allows the clip to act like a very stiff spring in its compressive action on said keys. By means of the rounding bottom on said keys engaging the rounded grooves of said wabble and spindle, each key is firmly seated in its groove by said compressive action, constant but slightly yielding, that is exerted by the clip 9 or other suitable form. Any inequality of contact of the said keys spanning the grooves 3 of the wabble and spindle is thus equalized, and backlash is reduced to a minimum or eliminated entirely.

While I have shown the said clip 9 in pairs the compressive action may be secured by other means such as a clamping ring as indicated by dotted lines in Fig. 4. This ring, though not secured by screw bolts to the sleeve, would likewise exert a yielding compressive action upon the horns of said keys according to the tightness of adjustment of the clamping bolt 10' as indicated.

I have shown two horns on each key for the principal reason of reducing the length of the slot 6 and providing stiffness at the center of the sleeve by the portion 11 of the sleeve intermediate of said horns. I prefer that the keys should have considerable axial length for engagement with the respective grooves of the matching ends of the shafts, and have shown the keys practically as long as the sleeve itself. The horns give stiffness to the portion forming the key proper, and are preferably beveled on their outer edges to their junction with the inner portion of said key. The space between said horns matches the central portion 11 of the sleeve and is preferably perpendicular to the shafts so that said keys may readily slide along in the grooves when the compressive action is released for adjustment or removal of the coupling. As illustrated, the coupling is centrally adjusted over the meeting ends of the shafts, and the horns in each key are adapted to transmit the compressive force of the clips, clamping ring or other means, directly to the corresponding shaft adjacent to the respective horns.

While I have described this coupling as applied to the meeting ends of a spindle and wabble of a hot roll, it will be understood that it may be varied in size or minor points of construction without departing from the spirit of my invention.

Having thus fully described my invention, what I claim as new and desire to secure by Letters Patent is:

1. The combination with adjacent ends of two shafts having rounded grooves in alinement, of matching keys engaging said grooves, a sleeve loosely fitting said shafts and said keys, and means to exert a compressive action on said keys substantially as described.

2. The combination with adjacent ends of two shafts having rounded grooves in alinement, of matching keys engaging said grooves, a sleeve loosely fitting said shafts and said keys, and spring clips adapted to exert a yielding compressive action on said keys substantially as described.

3. The combination with the wabble of a hot roll and a driving spindle having grooves substantially in alinement, of the herein described box coupling comprising a sleeve loosely mounted on said shafts and having openings opposite said grooves, keys adapted to fit said alined grooves and having horns projecting outward through the openings of said sleeve and compressive clips adapted to act on said horns and effect intimate engagement of said keys and grooves.

4. As a new article of manufacture the herein described box coupling comprising a sleeve adapted to fit loosely over the adjacent ends of alined shafts, locking pieces within said sleeve adapted to engage said shafts, and a clip outside of said sleeve adapted to exert a regulated compressive action on two or more of said locking pieces engaging said shafts.

5. The herein described box coupling comprising a cylindrical sleeve having openings at each side of a central brace and arranged in pairs diametrically disposed, locking pieces each having a pair of horns projecting through said openings beyond said sleeve, and embracing means bearing on a plurality of said horns substantially as and for the purpose described.

In testimony whereof I have affixed my signature in the presence of two witnesses.

WILLIAM C. CLARK.

Witnesses:
R. C. BARNEY,
H. J. ANDERSON.

Copies of this patent may be obtained for five cents each, by addressing the "Commissioner of Patents, Washington, D. C."